Oct. 10, 1933.  B. O. AUSTIN ET AL  1,929,670
CONTROL APPARATUS
Filed Feb. 28, 1931  2 Sheets-Sheet 1

WITNESSES:
R.J.Williams
W.G.Chilcott

INVENTORS.
Bascum O.Austin and
Norman H.Willby.
BY
ATTORNEY

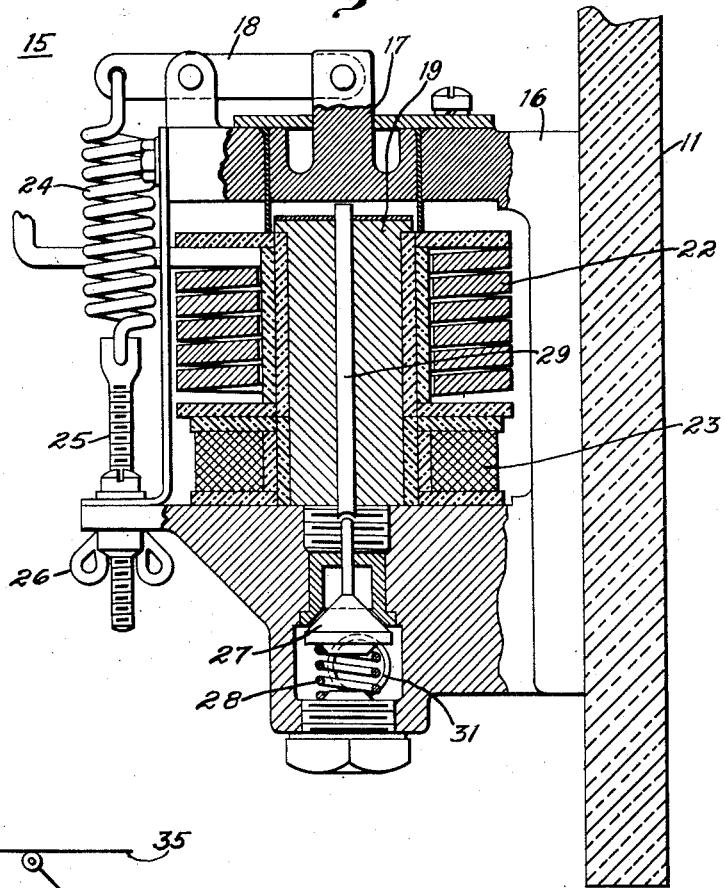
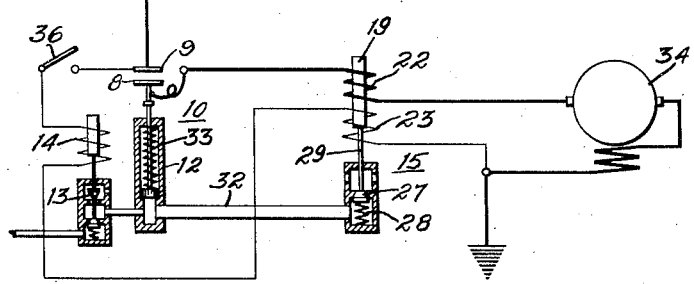

Patented Oct. 10, 1933

1,929,670

UNITED STATES PATENT OFFICE 1,929,670

CONTROL APPARATUS

Bascum O. Austin, Forest Hills, and Norman H. Willby, Wilkinsburg, Pa., assignors to Westinghouse Electric and Manufacturing Company, a corporation of Pennsylvania Application February 28, 1931. Serial No. 519,005

10 Claims. (Cl. 175—294)

Our invention relates to control apparatus and more particularly to pneumatically operated line switches, suitable for connecting motors or other apparatus to a power source.

An object of our invention, generally stated, is to provide a line switch which shall be simple and efficient in operation and that may be readily and economically manufactured.

A more specific object of our invention is to provide for opening the contact members of a pneumatically operated switch, under predetermined conditions, in a short time interval.

It is also an object of our invention to provide for disconnecting motors or other apparatus from a power source during an overload.

Other objects of our invention will be described fully hereinafter or will be apparent to those familiar with the art.

For a fuller understanding of the nature and scope of our invention, reference may be had to the following detailed description, taken in conjunction with the accompanying drawings, in which Figure 1 is a view, in front elevation, of a line switch embodying our invention.

Fig. 2 is an enlarged view, partially in side elevation and partially in section, taken along the line II—II of Fig. 1 and showing details of the structure of an overload-trip mechanism constructed in accordance with our invention.

Fig. 3 is a diagrammatic view, showing the manner of connecting the line switch in a system of control.

Figure 1:
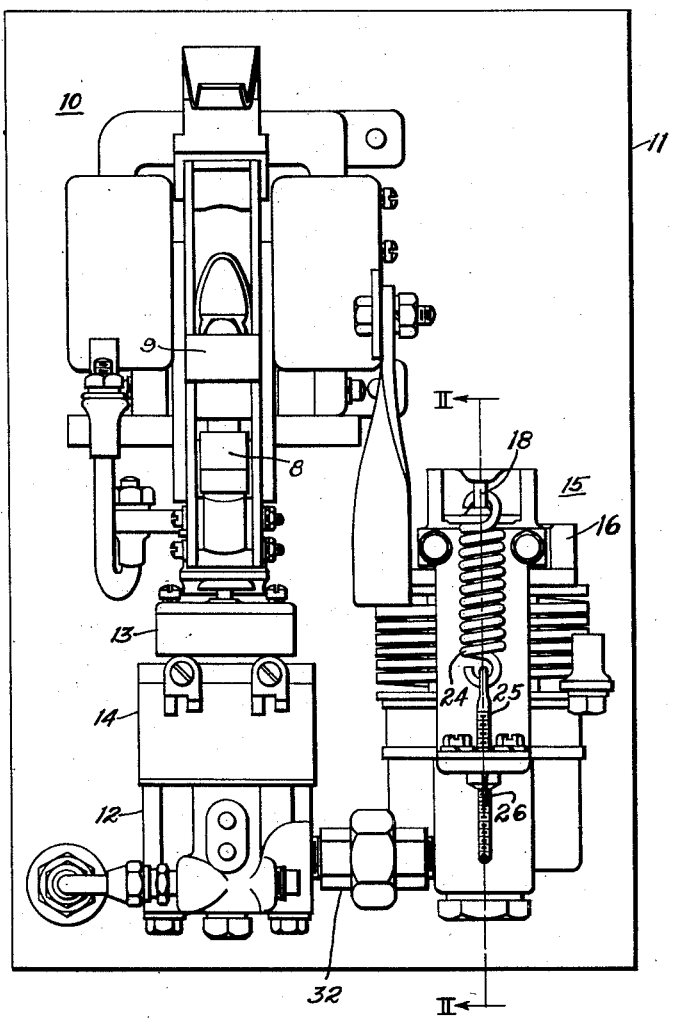

Referring to the drawings, 10 designates, generally, a pneumatically operated switch which is mounted upon an insulating panel 11. The switch 10 may be a pneumatically operated contactor, of any standard type, suitable for connecting motors or other apparatus to a power source. The switch illustrated comprises a movable contact member 8 which is disposed to engage a fixed contact member 9. The movable contact member 8 is actuated into engagement with the fixed contact member 9 by a piston disposed in an air cylinder 12. A magnet valve 13, of a type well known in the art, is provided for controlling the application of air pressure to the piston in order to actuate the switch 10 to the closed position. The magnet valve 13 is provided with an actuating coil 14 for operating its valve members to control the operation of the switch 10 by admitting air to the cylinder 12 and by permitting air to be exhausted from the cylinder 12.

When switches of this type are utilized for connecting electric motors to a power source, it is necessary to provide a means for disconnecting the motors from the line when the motors are subjected to overload conditions in order that they shall not be injured by the excessive amount of current flowing through the motor windings. If the motor current increases to a predetermined value, it is desirable to disconnect the motor from the line as quickly as possible to prevent injury to the motor. It is, therefore, necessary that a line switch be provided in which the contact members shall be opened in the shortest time interval possible, under overload conditions, and which will not operate at a high speed under normal conditions, in order to avoid excessive strain on the mechanical parts of the switch.

In order that the contact members of the switch 10 shall be opened in a short time interval under overload conditions, relay 15 is provided for causing the switch 10 to be opened when the relay is energized by a predetermined amount of current. The relay 15 is mounted upon the panel 11 and is so connected to the switch 10 that the pressure fluid may be released from the air cylinder 12 through the relay 15, instead of through the magnet valve 13, as during normal operation.

As shown in Fig. 2, the relay 15 comprises a frame 16, which is mounted upon the panel 11. An armature 17 is pivotally mounted upon the frame 16 by means of a lever arm 18. The armature 17 is disposed to be actuated by a core 19 when the core is energized. The relay 15 is provided with two coils which are both mounted on the core 19. An actuating coil 22 is disposed to be connected in series-circuit relation to the contact members of the switch 10 and is designed to carry the load current of the motor or other apparatus which is connected to a power source by the switch 10. A holding coil 23 is also mounted upon the core 19 and may be connected across the source of power for the motor or other apparatus which is being operated.

The relay 15 is so designed that the armature 17 will be actuated downwardly when the coil 22 is energized by a predetermined amount of current. The magnetism produced by the coil 23 is not capable of actuating the armature 17, but it is of sufficient strength to retain the armature 17 in its lowermost position after it has once been actuated to this position by the coil 22.

The amount of current required in the coil 22 to actuate the armature 17 may be governed by varying the tension of a spring 24 which is connected to one end of the lever arm 18. The tension of the spring 24 may be varied by an adjustable bolt 25 and thumb screw 26. In this manner, the amount of current permitted to flow in the coil 22, without actuating the armature 17, may be governed.

In order that the relay 15 may be utilized to permit the switch 10 to be opened in a short time interval, the relay 15 is provided with a valve 27, which is disposed to be actuated by the armature 17. The valve 27 is normally biased to its closed position by a spring 28, to prevent air from flowing past the valve.

As shown in Fig. 2, the valve 27 may be opened by a valve tappet 29 which extends through the core 19 and is actuated downwardly by the armature 17 when it is attracted by the core 19.

It will be observed that the areas of the valve 27 and also a port 31 through which air is permitted to escape from the cylinder 12, is much larger than the areas of the valves and ports provided in the magnet valve 13 through which the air flows during normal operation. A pipe 32 is provided for connecting the air cylinder 12 to the valve chamber of the relay 15. It will be readily understood that, when the valve 27 is opened, the air will be permitted to escape rapidly from the air cylinder 12, and the movable contact member of the switch 10 will be quickly actuated to its lowermost position by a spring 33, which is provided inside the air cylinder 12.

The operation of the switch 10 and relay 15 may be understood by referring to Fig. 3, which shows how the switch and relay may be connected in a motor circuit. In this diagram, a motor 34 is connected to a line conductor 35 by means of the switch 10. It will be observed that the series or actuating coil 22 of the relay 15 is connected in series-circuit relation to the motor and the contact members of the switch 10. The holding coil 23 of the relay 15 may be connected across the power source, in series with the actuating coil 14 of the magnet valve 13, by means of a switch 36. When the switch 36 is closed, the coil 14 is energized, and the magnet valve 13 is actuated to admit air to the cylinder 12 to close the contact members of the switch 10. The air is not permitted to escape through the valve 27 since it is biased to its closed position by the spring 28, and, as previously explained, the valve 27 will not be opened when only the holding coil 23 is energized. The switch 10 may be opened and closed, as desired, to stop and start the motor 34 during normal operation, by actuating the switch 36 to operate the magnet valve 13.

As previously explained, when the current in the motor circuit and in the actuating coil 22 of the relay 15 exceeds a predetermined amount, the valve 27 is opened and, therefore, the air is permitted to escape rapidly through the large openings provided in the relay 15. In this manner, the movable contact member of switch 10 is acuated to its lowermost position as quickly as possible after the overload condition occurs, and the motor 34 is disconnected from the power source. After the valve 27 has been opened by the actuating coil 22 of the relay 15, it will be held open by the holding coil 23, which remains energized as long as the switch 36 is closed. Therefore, the switch 10 cannot be reclosed until an operator has opened the switch 36 to deenergize the holding coil 23 and thereby reset the relay 15. In this manner, the motor 34 is prevented from being reconnected to the line 35 until the operator desires to do so.

From the foregoing description, it will be evident that we have provided a pneumatically operated line switch which will quickly disconnect a motor, or other apparatus, from a power source in case of an overload, and which is of simple and rugged design and may be economically manufactured.

Since numerous changes may be made in the above-described construction and different embodiments of the invention may be made without departing from the spirit and scope thereof, it is intended that all matter contained in the above description or shown in the accompanying drawings, shall be interpreted as illustrative and not in a limiting sense.

We claim as our invention:

1. In a switch, in combination, a fixed contact member, a movable contact member disposed to engage the fixed contact member, a spring disposed to bias the movable contact member to the open position, electro-pneumatic means for actuating the movable contact member into engagement with the fixed contact member, a valve member disposed to permit the contact members to be separated rapidly and independently of the electro-pneumatic means, electro-magnetic means disposed to actuate the valve when energized by a predetermined amount of current, and means when energized for causing the movable contact member to be retained in its open position.

2. In a switch, in combination, a fixed contact member, a movable contact member disposed to engage the fixed contact member, a spring disposed to bias the movable contact member to the open position, fluid-pressure means for actuating the movable contact member into engagement with the fixed contact member, a magnet valve for normally controlling the operation of the fluid-pressure actuating means, and an overload trip device disposed to rapidly release the fluid-pressure actuating means independently of the magnet valve to permit the contact members to be opened in a minimum amount of time under predetermined conditions.

3. In a switch, in combination, a fixed contact member, a movable contact member disposed to engage the fixed contact member, a spring disposed to bias the movable contact member to the open position, fluid-pressure means for actuating the movable contact member into engagement with the fixed contact member, a magnet valve for normally controlling the operation of the fluid-pressure actuating means, and an overload trip device disposed to rapidly release the fluid-pressure actuating means independently of the magnet valve to permit the contact members to be opened in a minimum amount of time under predetermined conditions, said device having an actuating coil connected in series-circuit with the contact members of the switch.

4. In a line switch, in combination, a fixed contact member, a movable contact member disposed to engage the fixed contact member, a spring disposed to bias the movable contact member to the open position, fluid-pressure means for actuating the movable contact member into engagement with the fixed contact member, a magnet valve for normally controlling the application of a pressure fluid to the fluid-pressure actuating means, and an overload trip device disposed to permit the rapid exhaustion of the pressure fluid independently of the magnet valve to cause the contact members of the switch to be opened in a short time interval.

5. In a line switch, in combination, a fixed contact member, a movable contact member disposed to engage the fixed contact member, a spring disposed to bias the movable contact member to the open position, fluid-pressure means for actuating the movable contact member into engagement with the fixed contact member, a magnet valve for normally controlling the application of a pressure fluid to the fluid-pressure actuating means, and an overload trip device disposed to permit the rapid exhaustion of the pressure fluid independently of the magnet valve to cause the contact members of the switch to be opened in a short time interval, said device having an actuating coil connected in series-circuit with the contact members of the switch and a valve member connected to the fluid-pressure actuating means.

6. In a line switch, in combination, a fixed contact member, a movable contact member disposed to engage the fixed contact member, a spring disposed to bias the movable contact member to the open position, electro-pneumatic means for actuating the movable contact member into engagement with the fixed contact member, and an overload trip device for causing the contact members to be opened rapidly and independently of the electro-pneumatic means when it is energized by a predetermined amount of current.

7. In a line switch, in combination, a fixed contact member, a movable contact member disposed to engage the fixed contact member, a spring disposed to bias the movable contact member to the open position, electro-pneumatic means for actuating the movable contact member into engagement with the fixed contact member by fluid pressure, and an overload trip device for causing the contact members to be opened independently of the electro-pneumatic means when it is energized by a predetermined amount of current, said device comprising a core member, a pivotally mounted armature disposed to be actuated when the core is magnetized, an energizing coil mounted on the core and a valve member disposed to be actuated by the armature to release the fluid pressure rapidly to permit the movable contact member of the switch to be actuated to its lowermost position in a short time interval.

8. In a switch, in combination, a fixed contact member, a movable contact member disposed to engage the fixed contact member, electro-pneumatic means for normally controlling the engagement of the contact members, a spring disposed to bias the movable contact member to the open position, a valve disposed to permit the contact members to be opened quickly and independently of said electro-pneumatic means under predetermined conditions, and electromagnetic means for actuating the valve comprising a core member, an energizing coil surrounding the core, and a pivotally-mounted armature actuated by the magnetization of the core, said armature being disposed to actuate the valve to effect the opening of the contact members of the switch.

9. In a switch, in combination, a fixed contact member, a movable contact member disposed to engage the fixed contact member, electro-pneumatic means for normally controlling the engagement of the contact members, a spring disposed to bias the movable contact member to the open position, a valve disposed to permit the contact member to be opened quickly under predetermined conditions, and electromagnetic means for actuating the valve comprising a core member, an energizing coil surrounding the core, a pivotally-mounted armature actuated by the magnetization of the core, said armature being disposed to actuate the valve to effect the opening of the contact members of the switch, and a holding coil disposed to retain the valve in a position to prevent the reclosing of the contact members while the holding coil is energized.

10. An overload trip device for a switch actuated by fluid pressure comprising a valve member disposed to release the fluid pressure, a spring for normally biasing the valve to the closed position, a core member, an energizing coil for magnetizing the core, a pivotally-mounted armature actuated by the magnetization of the core, said armature being disposed to actuate the valve to the open position to effect the opening of said switch, a holding coil disposed to retain the valve in the open position to prevent the reclosing of the switch while the holding coil is energized, and means for controlling the energization of the holding coil.

BASCUM O. AUSTIN.
NORMAN H. WILLBY.